United States Patent Office 3,798,191
Patented Mar. 19, 1974

3,798,191
INORGANIC CEMENT COMPOSITIONS CONTAINING EPOXY RESIN AND POZZOLAN
James H. Donnelly, San Francisco, Calif., assignor to Epoxon Corporation, San Francisco, Calif.
No Drawing. Continuation-in-part of application Ser. No. 157,250, Dec. 5, 1961, now Patent No. 3,198,758, which is a continuation-in-part of application Ser. No. 817,477, June 2, 1959. This application July 26, 1965, Ser. No. 474,946
The portion of the term of the patent subsequent to Aug. 3, 1982, has been disclaimed
Int. Cl. C08g 30/00, 51/04
U.S. Cl. 260—13
19 Claims

ABSTRACT OF THE DISCLOSURE

This invention is directed to an inorganic cement composition comprising from 1 to 300 parts by weight of inorganic cement, of which from 5–100% by weight is pozzolan, and from 1–200 parts by weight of a thermosetting epoxy resin and an amine curing agent therefor.

---

This application is a continuation-in-part of the patent application of James Howard Donnelly, Ser. No. 157,250, filed Dec. 5, 1961, now Pat. No. 3,198,758, for Inorganic Cement-Epoxy Resin Compositions Containing Animal Glue, which is a continuation-in-part of the parent application of James Howard Donnelly, Ser. No. 817,477, filed June 2, 1959, for Cement-Epoxy Spray Coating Compositions.

This invention relates to cement compositions for use in the construction, coating or resurfacing of buildings, highways, airstrips, water conduits, flumes, bridges, metal and wooden piling, metal and concrete pipes, industrial tanks and vessels and like installations.

It is a primary object of the present invention to provide inorganic cement compositions of improved body, pourability, workability, cohesive qualities and strength.

It is another important object of the present invention to provide fiber glass-reinforced concrete products which remain stable and strong over a long service life.

The desirability of using fiber glass as a reinforcing aggregate for concrete long has been recognized. Fiber glass-reinforced concrete products are of great strength and potentially are useful in a diversity of major applications such as thin, lightweight structural slabs, thin linings for dirt canals and coatings for steel pipe.

Heretofore it has been impossible to use fiber glass-reinforced concrete for the foregoing and other uses for the reason that the cement content of the concrete in a short time attacks the fiber glass, dissolving it and rendering it useless as a reinforcing agent. The present invention overcomes this difficulty and makes possible the large scale commercial use of fiber glass-reinforced concrete in structures which are strong, stable, and permanent.

Still another object of the invention is the provision of inorganic cement compositions which are particularly well suited for spray gun application and which have remarkable ability to hang on vertical surfaces without sloughing off. The latter feature is of great importance when the compositions are applied to one of their major uses, as coatings on walls and ceilings.

In accordance with the present invention, a pozzolan-containing inorganic cement and a thermosetting epoxy resin are combined to form compositions which may be reinforced successfully with fiber glass and which are widely applicable as structural materials per se, or as coatings having manifold and significant advantages, as follows:

First, the compositions are applicable as coatings over a diversity of surfaces including wood, plywood, metal, masonry, plaster, stucco, and either green or cured concrete.

Second, the resulting structures are of great strength and retain their strength over a long period of time.

Third, the compositions provide surfaces which are highly resistant to the action of alkalies, acids, and other chemical reagents, as well as to atmospheric agents and agents of physical degeneration. This is of great importance in applications such as tanks, pipes, tank linings, pipe linings, flumes, floors and piling where the applied composition is subjected to the action of chemical agents. It also is of importance when the applications are used for the resurfacing of air strips (for jet fuel resistance); for the resurfacing of highways (for resistance to gasoline, oil, de-icing chemicals, spalling, and freeze-thaw action); and for building reservoirs, dams, drydocks, flumes and other structures (for imparting resistance to weathering and physical deterioration).

Fourth, the epoxy resin acts as a highly efficient air entrainment agent with the result that there may be prepared cured compositions having a controlled amount of entrained air in the form of small, uniformly dispersed bubbles of controlled size. These are surrounded by shells of the inorganic cement-epoxy resin mixture. They assist greatly in applying the uncured compositions where they serve in effect as lubricating agents making it possible to pump, spray, gun-on, cast, pour, spin, rod, float, trowel and finish the compositions at a substantial saving over conventional concrete, stucco, mortar, or plaster. In addition, the strong, uniformly dispersed bubbles impart to the compositions maximum workability plus maximum strength for given weight.

Fifth, the uncured compositions exhibit superior cohesive and adhesive qualities. In other words, they do not bleed but remain plastic over long periods of time. Hence, they pump easily when being sprayed premixed wet, or when applied at the nozzle in a dry Gunite mix. In addition, they work easily when being troweled, rodded, floated, and finished. Still further, rebound losses during wet or dry spraying are greatly reduced, thus saving in labor and materials.

Sixth, it is possible to transport the compositions in bulk from the site of mixing to the site of application without the hazard of premature setting in concrete truck transit mixers.

Seventh, the finished articles possess great dimensional stability, strength, and adhesion. During hardening they demonstrate substantially less shrinkage than do conventional concrete and mortar. In addition, they are more flexible, stronger, and bond better to reinforcing metal with which they may be used, as well as to concrete and masonry surfaces to which they are applied. They also show higher compressive strength with age.

Eighth, the herein described compositions enable metal reinforcing and metal surfaces with which they are in contact to resist corrosion.

Ninth, since the epoxy resins cure in alkaline environments, the inorganic cement-epoxy resin compositions of the present invention not only tolerate in inclusion of the so-called "high alkali" cements but even use them to advantage, the epoxy resin apparently tying up the alkali and preventing alkali-induced deterioration of the cured cement article during its use. This in effect makes possible the advantageous application of the high alkali cements, which are available at substantially reduced cost to the cement manufacturer, and which heretofore have not been usable in many structural applications.

Tenth, the efficiency of the cement hydration process is increased by affording control of the time of generation of internal temperature during the hydration and setting of the composition.

Generally indicated, the constiuents of the compositions of my invention are as follows:

TABLE I
(Sacking and patching compositions)

|  | Parts by weight | |
| --- | --- | --- |
|  | General | Preferred |
| Inorganic cement of which 5-100% comprises activated pozzolan | 1-300 | 10-150 |
| Thermosetting epoxy resin and curing agent therefor | 1-200 | 3-100 |

TABLE II
(Structural compositions)

|  | Parts by weight | |
| --- | --- | --- |
|  | General | Preferred |
| Inorganic cement of which 5-100% comprises activated pozzolan | 1-300 | 10-150 |
| Thermosetting epoxy resin and curing agent therfor | 1-200 | 3-100 |
| Concrete aggregate (for each part by weight of the combined weights of inorganic cement and epoxy resin) | 0.1-20 | 0.1-10 |

The inorganic cements employed in the compositions of my invention comprise in general the water-settable hydraulic cements such as ordinary gypsum cement, the fast and slow setting gypsum cements, the high-alumina cements (e.g. Lumnite cement), portland cement and, particularly, activated pozzolan.

By definition (U.S. Army Corps of Engineer Specification for Pozzolan for use in Portland-Cement Concrete CRD-C-262-63, issued Mar. 1, 1963), pozzolan is siliceous or siliceous-aluminous material which in itself possesses little or no cementitious value but which will, in finely divided form and in the presence of moisture, react chemically with calcium hydroxide at ordinary temperature to form compounds possessing cementitious properties. "Activated pozzolan," as the term is used herein, comprises pozzolan containing an amount of calcium hydroxide or other setting agent sufficient to impart cementitious properties to the pozzolan.

Both natural and manufactured pozzolans may be used. Exemplary of natural pozzolans are certain of the diatomaceous earths; opaline cherts and shales; tuffs and volcanic ashes or pumicites; "Celite" (a diatomaceous earth); and Monterey shale.

Exemplary of manufactured pozzolans are various of the calcined clays and shales, and fly ash, the latter being the finely divided residue that results from the combustion of ground or powdered coal.

Chemically, a typical pozzolan has the following composition:

TABLE III

| | Percent by weight |
| --- | --- |
| Silicon dioxide ($SiO_2$) plus aluminum oxide ($Al_2O_3$) plus iron oxide ($Fe_2O_3$), min. percent | 70.0 |
| Magnesium oxide (MgO), max. percent | 5.0 |
| Sulfur trioxide ($SO_3$), max. percent | 4.0 |
| Loss on ignition, max. percent | 10.0 |
| Moisture content, max. percent | 3.0 |
| Available alkalies, max. percent | 1.5 |

The analysis of a specific pozzolan, Monterey shale, is given in Table IV.

TABLE IV

|  | Percent by weight | |
| --- | --- | --- |
|  | General | Specific |
| $SiO_2$ | 70-80 | 74.27 |
| $Al_2O_3$ | 8-12 | 10.08 |
| $Fe_2O_3$ | 2-4 | 3.14 |
| CaO | 2-4 | 2.93 |
| MgO | 0.5-2 | 0.86 |
| $K_2O$ | 0.5-2 | 1-16 |
| $Na_2O$ | 0.5-2 | 0.95 |
| $H_2O$ | Balance | Balance |

When included in the compositions of my invention as all or part of the inorganic cement content thereof, the activated pozzolans give them body, impart to them greater pourabiliy and greater workability, improve their cohesive qualities, increase their strength after aging, and impart to them the ability to hang on vertical surfaces without sloughing off. In paricular, they render the compositions inert to fiber glass which, accordingly, may be included in, or used exclusively as, the aggregate or reinforcing component.

It is another important feature of the invention that high alkali cements may be used with the epoxy resin in the formulation of certain of the presently described cementitous compositions.

The term "high alkali cement" as used herein means a portland cement containing from 0.6-2.5% by weight of sodium and potassium alkaline salts, expressed as $Na_2O$, as determined by the procedure of ASTM Standard C 114-58T.

When the high alkali cements are used in the presently described compositions there still are produced structural products which are useful and which do not demonstrate in fatal degree the deterioration normally evidenced by concrete structures made from high alkali cements. By an unknown mechanism the epoxy resin, when used with the high alkali cement, inhibits in substantial measure, or even totally, the fine cracking, spalling, and similar effects customarily characterizing the application of the high alkali cements. In addition, the alkaline medium furnished by the cement is favorable to the setting of the epoxy resin.

As a consequence, these cements now may be employed in structural applications to which they formerly were not suited. This obviously is of the greatest importance, since their availability is great and the extra cost to the manufacturer of producing low alkali cements is from 20 to 50 cents per barrel. Hence a very substantial saving is gained.

The compositions of the invention may be marketed and used per se as sacking or patching compounds (Table I), or as structural compositions including a substantial proportion of a concrete aggregate or reinforcing material (Table II).

Examples of concrete aggregates or reinforcing materials which may be used together with the inorganic cement and epoxy resin are sand, gravel, crushed rock, slag, volanic ash, exploded shale, clay, exploded clay, pearlite, vermiculite, pumice, cinders, wood pulp, wood chips, wood shavings, sawdust, cork, emery, trap rock, glass beads, ground glass, and pieces of foamed phenolic resin, foamed polyester resin, and other foamed resins.

Even the so-called "reactive" aggregates, as determined by the method of ASTM specification C 227-58T, may be used with the herein described compositions which include high alkali cements. In this case, the epoxy resin content of the composition substantially reduces the deleterious reaction normally occurring between the alkali content of the cement and the reactive aggregate.

In particular, fiber glass may be employed as reinforcing or aggregate material since in the presence of pozzolan the fiber glass is not attacked by the cement.

Also, the cement bonds securely to the fiber glass, a result heretofore difficult or impossible of achievement. In this way there is produced a fiber glass-reinforced concrete which is nonelectrolyzable and highly resistant to shock and vibration.

Any of the fiber glass products of commerce are suitable for the indicated purpose. They require no special treatment except subdivision into the desired length, for example, a length of from one-half to two inches or even longer where particularly high strength is required. If desired, woven fiber glass cloth may be used as the structural base.

Since any proportion of fiber glass assists in imparting strength to the product, the fiber glass may constitute from 0.1 to 100% by weight of the aggregate component of the cement-epoxy resin compositions.

The total aggregate, in turn, may be used in the proportions customarily employed in formulating mixes for various structural purposes, i.e. in "structural proportions." In general from 0.1 to 20, preferably from 1 to 10, parts by weight of aggregate are employed with each part by weight of the total cement-epoxy resin component of the mixes.

The epoxy resins which comprise another primary constituent of the herein described compositions, include broadly the thermosetting resinous materials, the molecular structure of which is characterized by the presence of vicinal epoxy or ethoxyline groups serving as polymerization points. Such resins result in general from the copolymerization of a monomer containing an epoxy group, or groups convertible to an epoxy group, with a monomer which is characterized by the presence of hydroxyl groups, such as a di- or poly-hydric phenol, or a di- or poly-hydric alcohol.

An example of a monomer furnishing the epoxy group is epichlorohydrin.

Examples of monomers furnishing hydroxyl groups are the mononuclear di- and tri-hydroxy phenols including resorcinol, hydroquinone, pyrocatechol, saligenin and phloroglucinol; glycerol; and the polynuclear and polyhydroxy phenols including bisphenol A, bisphenol F, trihydroxyl diphenyl dimethyl methane 4,4'-dihydroxy biphenyl, and the long-chain bisphenols.

An example of an epoxy resin particularly suitable for the present purposes is the thermosetting resinous condensation product of epichlorohydrin and bishphenol A, the latter being the reaction product of phenol and acetone, $(CH_3)_2C(C_6H_4OH)_2$. Another example is the thermosetting resinous condensation product of epichlorohydrin and bisphenol F, $CH_2(C_6H_4OH)_2$. Still another example is the thermosetting resinous condensation product of epichlorohydrin and glycerol.

Epoxy resins of the foregoing class are available from various commercial sources and in varying form, depending in part upon their degree of polymerization. All of them possess the characteristic of condensing when treated with catalytic materials or, more properly, with curing agents of various categories.

Thus the curing agents in general may comprise the various aliphatic, aromatic, primary, secondary, or tertiary amine curing agents having reactive hydrogen attached to amine groups thereof.

Specifically applicable are ethylene diamine, diethylenetriamine, triethylenetetramine, tetraethylene pentamine, diethylamino-propylamine, metaphenylenediamine, piperidine, diaminodiphenylsulfone, menthane diamine, and polyamide resins with which the epoxy resins may be cross linked.

Of particular interest as curing agents are the polyamide-type condensation polymers of dimerized and trimerized vegetable oil, unsaturated fatty acids, and aryl or alkyl polyamines ("Versamides"). These products have molecular weights of up to 10,000 and melting points of up to 190° C. Although classified as polymides, they contain free amine groups which serve the desired catalytic function.

The curing agents are used in varying amount depending upon the quantity required to accomplish the required degree of linking or cross linking and setting of the epoxy resin in a stipulated setting time. It usually is desirable to use at least the stoichiometric amount of curing agent. When curing an epichlorohydrin-bisphenol A resin with polyamide ("Versamide") the ratio of resin to polyamide should be from 1:2 to 2:1 parts by weight.

In applying the compositions of the invention, it is necessary to mix them with an aqueous liquid comprising water, or a water solution of an inorganic compound, or of a suitable organic liquid. The aqueous liquid serves three important functions. First it hydrates the inorganic cement, liberating heat and resulting in the setting of the cement and curing of the resin. Secondly, it assists in the dispersion of the resin throughout the finished composition. Third, it lubricates the mixture and imparts to it the required degree of workability, plasticity, coherence and resistance to separation. The latter functions require more water than will combine chemically with the cement. Thus the amount employed may be characterized as being a quantity sufficient to hydrate the cement, lubricate the composition, and disperse the epoxy resin.

In a typical composition, the hydrating water is the amount defined by the Portland Cement Association as being the amount required to hydrate fully the particular cement employed. In addition, there must be used an amount of supplemental water for dispersing the resin and lubricating the mix. The total amount of water contained in a typical mix thus will run from 3-12 gallons per 100 pounds of cement.

Although the aqueous liquid may disperse the resin by first dissolving it and then serving as a medium for conveying it throughout the structure of the composition, it normally serves this function by emulsifying the resin. Accordingly, it usually is desirable to include in the resin-curing agent system an effective proportion of a suitable emulsifying agent. A wide variety of conventional emulsifying agents may be employed for this purpose, using them with or without an antifoaming agent as required to produce an emulsion of the desired properties.

As special dispersing agents, which serve also as gelling agents for the cement, there may be included a substantial proportion of proteinaceous glue or gelatine polyvinyl alcohol, methyl cellulose, or carboxymethyl cellulose.

As used herein, the term "proteinaceous glue or gelatine" is intended to comprehend the various organic protein colloids, particularly those derived from animal sources, such as hide, blood, bone and fish scraps.

By "polyvinyl alcohol" is meant the polymeric product having the general formula $(CH_2CHOH)$, which product may be either partially acetylated, e.g. from 2 to 30% acetylated, or fully hydrolyzed. It is available in a variety of commercial forms such as Du Pont's "Elevanol," or Air Reduction's "Vinol PA-5" and "Vinol PA-20."

By "methyl cellulose" is meant the commercial water soluble methyl ether of cellulose.

The dispersing or gelling agent may be added in one of several stages during the preparation of the compositions. Thus it may be added during the grinding of the cement clinker where the grinding operation disperses it uniformly throughout the cement. In the alternative, it may be mixed dry with the cement or aggregate, or stirred into the curing agent, or dissolved in the water before these respective components are compounded with the other constituents of the composition.

When used, the dispersing agent serves an air entraining function, reinforcing the air entraining properties of the epoxy resin. This is of great importance in the preparation of compositions having a high air content, for example, up to 60% by volume of air in the form of small individual bubbles.

In addition, the emulsifying agent makes the compositions flow better and imparts to them superior tensil and compressive strength. This is believed due to the creation by the epoxy resin and agent of a physical shell surrounding each individual air bubble. This leads to the production of a stronger article than is produced when the product contains merely the voids which are characteristic of an air-blown conventional concrete mix.

In their use as gelling agents, the polyvinyl alcohol, and methyl cellulose and other materials give added body to the uncured concrete and added cohesiveness and strength to the cured concrete.

Thus a typical specific formulation of the herein described composition is the following:

| | Parts by weight |
|---|---|
| Uncured portland cement | 1 |
| Pozzolan | 0.5–1 |
| Concrete aggregate | 1–8 |
| Thermosetting resinous condensation product of epichlorohydrin and bisphenol A, and curing agent therefor | .002–27 |
| Water | .25–1 |

A typical formulation in which fiberglass is used as a component is the following:

| | Parts by weight |
|---|---|
| Uncured portland cement | 1 |
| Pozzolan | 0.5–1 |
| Fiberglass | 0.1–20 |
| Thermosetting resinous condensation product of epichlorohydrin and bisphenol A, and curing agent therefor | .002–27 |
| Water | .25–1 |

A typical formulation of the invention in which an emulsifying agent is employed is as follows:

| | Parts by weight |
|---|---|
| Uncured portland cement | 1 |
| Concrete aggregate | 1–8 |
| Thermosetting resinous condensation product of epichlorohydrin and bisphenol A, and curing agent therefor | .002–27 |
| Animal glue, gelatin, polyvinyl alcohol or methyl-cellulose | .001–.200 |
| Water | .25–1 |

Although various mixing procedures may be employed in formulating the compositions of the invention, a generally suitable mixing procedure is as follows: First, the emulsifying agent is mixed with the curing agent or with the epoxy resin. The curing agent, with or without the emulsifying agent, then is mixed with the epoxy resin until the mixture starts to warm up. This may require from 1–10 minutes. The emulsifying water next is added, whereupon the interaction between the resin and curing agent is inhibited. The mixing is continued at a rapid rate until an emulsion is formed which contains the air in the form of uniform, fine bubbles.

The resulting activated mixture of epoxy resin, water, curing agent, and emulsifying agent then is added to the concrete mixture comprising cement, aggregate and additional water used in amount sufficient to lubricate the mix and hydrate the cement. This mixture may be mixed in conventional concrete or mortar mixers at the job site or in conventional concrete truck mixers.

As soon as the resin emulsion has been mixed thoroughly with the cement mixture, the resulting aerated composition may be applied by the selected technique. Thus it may be applied by pouring it into forms, or in mass concrete. It also may be used to manufacture concrete pipe by spinning, pouring or spraying concrete, or by spinning or spraying mortar.

Still further, it may be applied as a lining or coating for metal pipe by spinning, pouring, or spraying a concrete type mix on the interior or exterior of the pipe, or by spinning or spraying a mortar type mix on the interior and/or spraying a mortar type coating on the exterior of the pipe.

In the pumping and spraying of pre-mix concrete and mortar prepared either by the wet method or by the dry mix Gunite method, the mixtures can be injected at the nozzle instead of, or with, the mixing water.

The compositions still further may be applied in the fabrication of concrete wood or steel piling using a poured, in-form method, a gunning application, or a spraying procedure based on either a pre-mix wet method or a dry-mix Gunite method.

They also may be applied to the resurfacing of steel, wooden, or concrete pilings by gunning or spraying pre-mix wet mixtures or dry-mix Gunite mixtures.

Specific applications include their use as coatings by means of conventional grout pumps, mortar pumps, plaster pumps, and concrete pumps, as well as with Gunite dry mix guns in fire proofing surfaces of wood, plywood, or steel. They also may be employed in coating industrial vessels, concrete dams and flumes, concrete piles and pipes, metal pipes, floors and walls, railroad car interiors, building exteriors, air strip surfaces, and aircraft carrier or other ship decks. They also are well suited for coating tanks and vessels to be used for storing chemicals, which otherwise are subject to severe corrosion.

The coating may be applied to a depth commensurate with the contemplated end use. This may range for example from a fraction of an inch up to as much as 12 or 18 inches. Because of its stability, a surprisingly thin coating generally may be employed, with resulting weight reduction and economy of application.

Upon application, the constituents of the composition coact in the manner described above to result in its setting at a controlled, uniform rate. Thus the exothermic hydration of the inorganic cement provides a slow liberation of heat which promotes the setting of the epoxy resin. The water content of the composition, however, slows down the setting rate of the resin to a level at which it takes place uniformly, permitting application of the coating over a conveniently long period of time and to the requisite thickness. Also, the pot life of the spray mixture is extended to a value of several hours, further facilitating its application. As a result, uniform coatings and castings of great strength and cohesion are developed, as indicated in the following examples:

EXAMPLE 1

This example illustrates the preparation and application of the herein described inorganic cement compositions containing epoxy resin, pozzolan and fiber glass.

The following mixes were formulated:

| | Grams |
|---|---|
| Control mix: | |
| Cement (total alkalies as $Na_2O=0.54\%$) | 1700 |
| Water | 565 |
| Fiber glass (½ inch) | 40 |
| Text mix: | |
| Epoxy resin (Shell 828), premixed | 89 |
| Catalyst (Versamid 125), premixed | 97 |
| Pozzolan (Ventura shale) | 217 |
| Cement (total alkalies of $Na_2O=0.54\%$) | 900 |
| Fiber glass (½ inch) | 40 |
| Polyvinyl alcohol | 4.7 |

The foregoing ingredients were mixed to form a slurry. The fiber glass was added. Water was added to give a workable mix.

Briquets were made from the above mixes. ASTM compressive strength tests were made on the briquets at the end of two months with results as follows:

| | P.s.i. |
|---|---|
| Control mix (cement-fiber glass) | 380 |
| Test mix (cement-fiber glass-epoxy resin) | 740 |

EXAMPLE 2

This example illustrates the application of a high alkali portland cement in the herein described compositions.

The portland cement employed had a content of sodium and potassium alkaline salts of 1.4% by weight, calculated as Na$_2$O. This was incorporated in the following formulation:

|  | Parts by weight | |
|---|---|---|
|  | Test composition | Control |
| Cement containing 15% by wt. possolan | 1,820 | 1,820 |
| Ground Pyrex glass aggregate | 5,450 | 5,450 |
| Mix A: |  |  |
| Water | 1,000 | 1,000 |
| Proteinaceous glue | 18 | ---------- |
| Mix B: |  |  |
| Epoxy resin (epichlorohydrin bisphenol A) | 73 | ---------- |
| Polyamide curing agent ("Versamide") | 44 | ---------- |

First the cement and ground glass aggregate were mixed thoroughly in a mortar mixer. Mix A then was prepared by dissolving the glue in the warm water, adding the curing agent and stirring.

Mix B was prepared by thoroughly mixing together the epoxy resin and curing agent.

Mixes A and B were added to the blended cement-aggregate mixture and the resultant product thoroughly agitated. It then was cast into bars, which were cured for 24 hours.

A control mix having the indicated formulation also was prepared. The components of the control were thoroughly blended together and the resulting mixture cast into bars which also were cured for 24 hours.

Both samples then were tested according to the conventional activated aggregate test, ASTM specification C 227–58T. In carrying out this test, the length of the bar was measured after curing for one day and again after curing for 14 days, and the increase in length noted. In the case of the composition of the invention, the increase was 0.00911 in./in. In the case of the control, the increase was 0.01675 in./in., 84% more than in the case of the composition of the invention.

EXAMPLE 3

This example illustrates the beneficial effect of the inclusion of pozzolan together with a high alkali portland cement in the formulation of the compositions of the invention.

The procedure of Example 2 was repeated, with the exception that 454 grams (25%) of pozzolan was included in the mix.

The resulting mix was cast into bars which then were subjected to the activated aggregate test described above. In this case, the expansion of the test bars was but 0.00765 in./in. As compared with the control of Example 2, there thus was noted a 100% increase in the expansion of the control sample (without epoxy resin and pozzolan) over the test sample (with epoxy resin and pozzolan).

EXAMPLE 4

This example illustrates the application of an epichlorohydrin-glycerol epoxy resin used with pozzolan and portland cement in the formulation of the herein described compositions.

The following formulation was employed:

| | Pounds |
|---|---|
| Epoxy resin (epichlorohydrin-glycerol) and polyamide curing agent ("Versamide") | 9 |
| Portland cement | 9 |
| Sand aggregate | 29 |
| Pozzolan | 1 |

The foregoing materials were blended together and the resulting mixture cast into forms and sprayed onto vertical structural surfaces. In each case the cured product was observed to be uniform, tough, chemically resistant and, in the case of the sprayed applications, firmly bonded to the underlayment.

EXAMPLE 5

This example illustrates the compositions of the invention including portland cement, pozzolan, epoxy resin, and animal glue.

The following mortar mix formulation was employed:

| | Pounds |
|---|---|
| Epoxy resin (epichlorohydrin-bisphenol A) and curing agent ("Versamide") | 9 |
| Portland cement | 9 |
| Sand aggregate | 29 |
| Pozzolan | 1 |

The cement contained 72% type 1 "high alkali" clinker, 3% gypsum, 24% pozzolan and 1% hide glue, all ground together.

First the pozzolan was blended with the epoxy resin in a plaster type mixer. Next the pozzolan-epoxy resin blend was mixed with the curing agent, the curing agent being used in the amount of slightly more than ⅓ the weight of the epoxy resin.

Next, 4½ pounds of water was blended into the resin-pozzolan-curing agent system. Sufficient water was added to dry cement-aggregate system to make it workable and to hydrate the cement. The two systems then were blended together in a plaster mixer.

The foregoing procedure was repeated two more times, blending together the ingredients as required to form a total of three compositions having respective ratios, epoxy resin: cement, of 1–1, 2–1 and 4–1.

These three compositions were applied as linings to standard concrete pipe which then was cut into arcuate sections the ends of which were dammed to create reservoirs into which 10% sulfuric acid was poured. An unlined test section was used as a control. At the end of five weeks the samples were observed for corrosion. The control sample was badly flaked and corroded. The specimens lined with epoxy-cement were relatively unaffected, except in localized areas were defects in the coating permitted access of the sulfuric acid to the underlying conventional concrete base.

The three samples of epoxy-cement were tested for bonding to various surfaces. For this purpose they were sprayed onto a dry concrete base block, a wet-concrete base block and a steel plate. A conventional mixture of 3 parts of sand to 1 of portland cement was sprayed on the same three base materials to provide a basis of comparison.

After the samples had cured, the test patches were sheared off by means of a standard Tinius-Olsen Testing Machine, the loading speed of the machine being .05 inch per minute. In each case the load at failure in pounds was divided by the test patch area, giving an average bond strength in p.s.i. The results are given in the table below.

| Mixture of epoxy-concrete test specimen (patch) | Bonded to— | P.s.i. at failure | | | Avg. |
|---|---|---|---|---|---|
| 1:1 | Concrete—dry | 165 | 192 | 202 | 186 |
|  | Concrete—wet | 203 | 163 | 159 | 175 |
|  | Steel plate—sandblasted | 159 | 164 |  | 162 |
| 2:1 | Concrete—dry | 114 | 115 | 98 | 109 |
|  | Concrete—wet | 88 | 98 | 104 | 97 |
|  | Steel plate—sandblasted | 61 | 73 |  | 67 |
| 4:1 | Concrete—dry | 58 | 79 | 65 | 67 |
|  | Concrete—wet | 47 | 41 | 40 | 43 |
|  | Steel plate—sandblasted | 30 | 28 | 16 | 25 |
| Concrete mortar comparison | Concrete—dry | 23 | 28 | 20 | 24 |
|  | Concrete—wet | 13 | 8 | 8 | 10 |
|  | Steel plate—sandblasted | 0.1 |  |  |  |

Next the three samples, and the control sample, were tested for compressive strength. After a cure period of 120 days using the standard ASTM compression test, the compressive strengths of the samples were found to be as follows:

| Mixture: | Compressive strength, p.s.i. |
|---|---|
| 1:1 epoxy-cement | 2,504 |
| 2:1 epoxy-cement | 2,503 |
| 4:1 epoxy-cement | 2,632 |
| Conventional mortar | 1,886 |

During the foregoing procedures, visual observation was made of the samples to determine their shrinkage. Shrinkage was observed for the conventional concrete control. No visible shrinkage occurred for any of the epoxy-cement samples.

EXAMPLE 6

This example illustrates a formulation of the invention especially useful as a concrete mix, and its application to the production of spun concrete pipe.

The formulation employed was as follows:

| Mix A: | Pounds |
|---|---|
| Portland cement containing 20% by weight pozzolan | 564 |
| Sand | 1133 |
| Gravel | 1950 |
| Water | 277 |
| Mix B: | |
| Epoxy resin (epichlorohydrin-bisphenol A) | 176.80 |
| Polyamide curing agent | 91.2 |
| Water | 192 |

Mix A was prepared in a conventional concrete mixer.
Mix B was prepared in emulsion form and mixed with Mix A in the mixer.

The resulting composition then was spun into an epoxy-concrete pipe, which was cured in a steam chamber for 24 hours and put out to dry. After three days core samples were taken which were subjected to the ASTM compression strength test. The average compressive strength value of the samples was in excess of 5000 pounds per square inch. In addition, the pipe was characterized by the same acid resistance as were the pipe samples of Example 5, prepared from a coating or mortar mix formulation.

EXAMPLE 7

This example illustrates the protective action of the epoxy resin and pozzolan in preventing the chemical attack of cement on fiber glass used as a cement aggregate.

Control specimens containing portland cement and fiber glass aggregate, and test specimens containing portland cement, fiber glass aggregate, epoxy resin and pozzolan were prepared following the procedure outlined in Example 1. After the samples had cured, they were tested for flexural strength using the method of ASTM D790–59T.

Also, to test the deterioration of the fiber components of the cement, a quantity of the fibers was removed from the specimens and treated with 0.1% solution of Rhodamine B in methanol in order to accentuate any corrosion voids which might be present on the surface of the fibers as a result of alkali attack. The fibers then were observed under a microscope.

| Sample | Flexural strength, p.s.i. | Distance of head travel before fracture, mils | Attack on glass |
|---|---|---|---|
| Control sample No. 1 (low alkali cement) 0.54% Na₂O). | 770.5 | 6 | Major—no glass could be found. |
| Test sample No. 1 (low alkali cement 0.54% Na₂O). | 1,198.9 | 34 | None. |
| Control sample No. 2 (high alkali cement 1.13% Na₂O). | 548.1 | 17 | Major—no glass could be found. |
| Test sample No. 2 (high alkali cement 1.13% Na₂O). | 1,196.4 | 66 | None. |

EXAMPLE 8

This example illustrates the composition of the invention including polyvinyl alcohol as a gelling agent.

A mixture containing polyvinyl alcohol, epoxy resin, versamid catalyst, pozzolan (airox pozzolan Ventura calcined oil shale) cement and water. The epoxy resin mix was as follows:

| | Pounds |
|---|---|
| Epoxy A–B | 180.0 |
| Water | 438.0 |
| Pozzolan | 252.0 |
| Polyvinyl alcohol | 5.4 |

This was used together with cement in cement resin-ratios of 8:1 and 16:1 as follows:

8:1 Mix: 94 pounds cement, 12 pounds Epoxy A–B, and 24 pounds pozzolan.

16:1 Mix: 94 lbs. cement, 6 lbs. Epoxy A–B and 12 pounds of pozzolan.

To prepare the mixes the polyvinyl alcohol was put in hot water and allowed to stand until a gel formed. This required about two hours. The polyvinyl alcohol gel was put in a mixer and water added. The epoxy resin was added and the mixture emulsified. Pozzolan was added and the mixture further mixed.

The Versamid catalyst was put in a separate mixer and mixed with glacial acetic acid if required for acidity control. Water was added and the mixture emulsified.

The foregoing two mixtures were packaged separately. Just prior to their addition to the concrete mix, the proper amount of epoxy resin emulsion and versamid emulsion were mixed together. The resulting mixture then was added to a conventional concrete mix in the cement mixer. Samples were poured and tested with the results as follows:

Fresh concrete

| Test mixes mix No. | Cement resin ratio | C.F. SX/ CY | Water-cement sk. | Slump (in.) | Percent air | Unit wt. |
|---|---|---|---|---|---|---|
| 1 | 8/1 | 5.50 | 23.0 | 6 | 9.0 | 137.1 |
| 2 | 8/1 | 5.60 | 19.6 | 2.6 | 6.0 | 143.0 |
| 3 | 16/1 | 5.22 | 37.2 | 2.0 | 8.3 | 141.2 |
| 4 | 16/1 | 5.48 | 21.0 | 3.0 | 7.0 | 140.5 |

Hardened concrete

| Unit wt. | Crushing strength (p.s.i.) | |
|---|---|---|
| | 7 days | 28 days |
| 139 | 2,490 | 4,870 |
| 144.1 | 3,480 | 5,606 |
| 145.4 | 2,890 | 4,920 |
| 143.2 | 3,260 | 5,190 |

Fresh concrete

| Control mixes (plain portland cement) Mix no. | C.F. SX/ CY | Water cement sk. | Slump (in.) | Percent air | Unit wt. |
|---|---|---|---|---|---|
| 5 | 5.40 | 6.50 | 2.0 | 2.0 | 151.7 |
| 6 | 5.38 | 6.51 | 2.0 | 3.0 | 149.4 |

Hardened concrete

| Unit wt. | Crushing strength (p.s.i.) | |
|---|---|---|
| | 7 days | 28 days |
| 152.1 | 2,960 | 4,600 |
| 151.3 | 2,310 | 4,700 |

The observed advantages of including polyvinyl alcohol in the above mixes, in addition to improving their slump and strength properties, are that it behaves as a protective colloid and imparts to the mixture the ability to tolerate substantial concentrations of electrolytes, particularly acids. It enhances the emulsifying properties in both acid and alkali media. Furthermore, it improves the cohesive and gelling qualities of the mix.

Thus it will be apparent that by the present invention I have provided a cement-epoxy composition which is of great strength, which is uniform, and which may be applied to a great variety of services in a diversity of commercial installations. Since it may be applied in emulsion form it is self-lubricating and flows readily through the hoses and guns with which it is applied, without abrasive action.

After application, it can be troweled to give a smooth surface. Because of its strength, it may be used in relatively thin coatings, thereby saving substantially in cost. Because of its unusual adherence to base materials, it becomes unnecessary to wrap the latter with wire or concrete reinforcing material thereby making additional savings in cost. In addition, its service life is of great duration, since it is resistant to chemicals, solvents, oil and grease, atmospheric agents, and sea water.

Still further, the composition is adaptable for use with fiber glass aggregates to form strong reinforced products in which the fiberglass is not subject to attack by the cement component of the composition, but remains permanently as a strong, durable reinforcing constituent.

Having thus described my invention in preferred embodiments, I claim as new and desire to protect by letters patent:

1. An inorganic cement composition comprising
   (a) from 1 to 300 parts by weight of inorganic cement, of which from 5–100% by weight is pozzolan, and
   (b) from 1–200 parts by weight of a thermosetting epoxy resin and an amine curing agent having reactive hydrogens attached to amine groups thereof, the epoxy resin comprising the condensation product of epichlorohydrin and an hydroxyl-containing compound of the group consisting of glycerol and polyhydric phenols and containing a plurality of vicinal epoxy groups.

2. The inorganic cement composition of claim 1 wherein the inorganic cement is used in a proportion of from 10–150 parts by weight and the epoxy resin and curing agent are used in a combined amount of from 3–100 parts by weight.

3. The inorganic cement composition of claim 1 wherein the non-pozzolan inorganic cement component if any is portland cement.

4. The inorganic cement composition of claim 1 wherein the non-pozzolan inorganic cement component if any is gypsum cement.

5. The inorganic cement composition of claim 1 wherein the pozzolan component of the inorganic cement is diatomaceous earth.

6. The inorganic cement composition of claim 1 wherein the pozzolan component of the inorganic cement is Monterey shale.

7. The inorganic cement composition of claim 1 wherein the pozzolan component of the inorganic cement is Monterey shale having the composition:

| | Percent by weight (general) |
|---|---|
| $SiO_2$ | 70–80 |
| $Al_2O_3$ | 8–12 |
| $Fe_2O_3$ | 2–4 |
| CaO | 2–4 |
| MgO | 0.5–2 |
| $K_2O$ | 0.5–2 |
| $Na_2O$ | 0.5–2 |
| $H_2O$ | Balance |

8. The inorganic cement composition of claim 1 wherein the non-pozzolan cement component if any is a high alkali cement having an alkali content of from 0.6 to 2.5% by weight, expressed as $Na_2O$.

9. The inorganic cement composition of claim 1 wherein the epoxy resin is a resinous condensation product of epichlorohydrin and glycerol.

10. The inorganic cement composition of claim 1 wherein the epoxy resin is a resinous condensation product of epichlorohydrin and dimethyl-di-p-hydroxy phenyl methane.

11. The inorganic cement composition of claim 1 including from 0.1–30%, based on the weight of the cement component, of at least one gelling agent of the group consisting of animal glue, gelatin, methyl cellulose, carboxymethyl cellulose and polyvinyl alcohol.

12. The inorganic cement composition of claim 1 including from 0.1–30%, based on the weight of the cement component, methyl cellulose.

13. The inorganic cement composition of claim 1 including from 0.1–30%, based on the weight of the cement component, of carboxymethyl cellulose.

14. The inorganic cement composition of claim 1 including from 0.1–30%, based on the weight of the cement component, of polyvinyl alcohol.

15. The inorganic cement composition of claim 1 including from 0.1–20 parts by weight for each part by weight of the combined weights of inorganic cement and epoxy resin plus curing agent, of a concrete aggregate.

16. The inorganic cement composition of claim 1 including from 0.1–20 parts by weight for each part by weight of the combined weights of inorganic cement and epoxy resin plus curing agent, of fiber glass.

17. The inorganic cement composition of claim 1 wherein the epoxy resin is a resinous condensation product of epichlorohydrin and dimethyl-di-p-hydroxy phenyl methane.

18. An inorganic cement composition comprising
   (a) 10–150 parts by weight of inorganic cement of which 5–100% by weight is activated pozzolan,
   (b) from 3–100 parts by weight of a thermosetting resinous condensation product of epichlorohydrin and dimethyl-di-p-hydroxy phenyl methane and a polyamine curing agent having reactive hydrogen attached to amine groups thereof,
   (c) and from 0.1–10 parts by weight of concrete aggregate for each part by weight of the combined weights of inorganic cement and epoxy resin plus curing agent.

19. The cement composition of claim 18 wherein the concrete aggregate is fiber glass.

References Cited
UNITED STATES PATENTS

| | | | |
|---|---|---|---|
| 3,002,881 | 10/1961 | McDonnell et al. | 162—166 |
| 3,198,758 | 8/1965 | Donnelly | 260—29.2 |
| 3,310,511 | 3/1967 | Reinert | 260—29.2 |

JOHN C. BLEUTGE, Primary Examiner

U.S. Cl. X.R.

260—6, 29.2 EP, 37 EP, 836, 837 R